Dec. 25, 1962  H. A. TOULMIN, JR  3,069,736
METHOD AND APPARATUS TO STERILIZE PUMP WATER
AS AND WHEN IT IS PUMPED
Filed July 25, 1960  2 Sheets-Sheet 1

INVENTOR.
HARRY A. TOULMIN JR.
BY Toulmin & Toulmin
ATTORNEYS

Dec. 25, 1962  H. A. TOULMIN, JR  3,069,736
METHOD AND APPARATUS TO STERILIZE PUMP WATER
AS AND WHEN IT IS PUMPED
Filed July 25, 1960  2 Sheets-Sheet 2
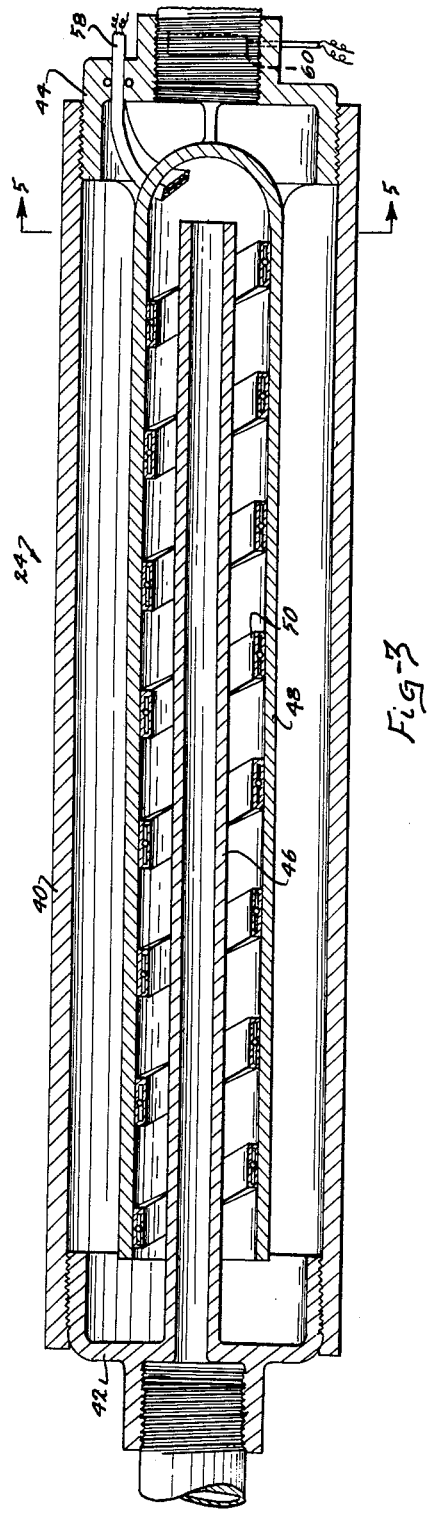
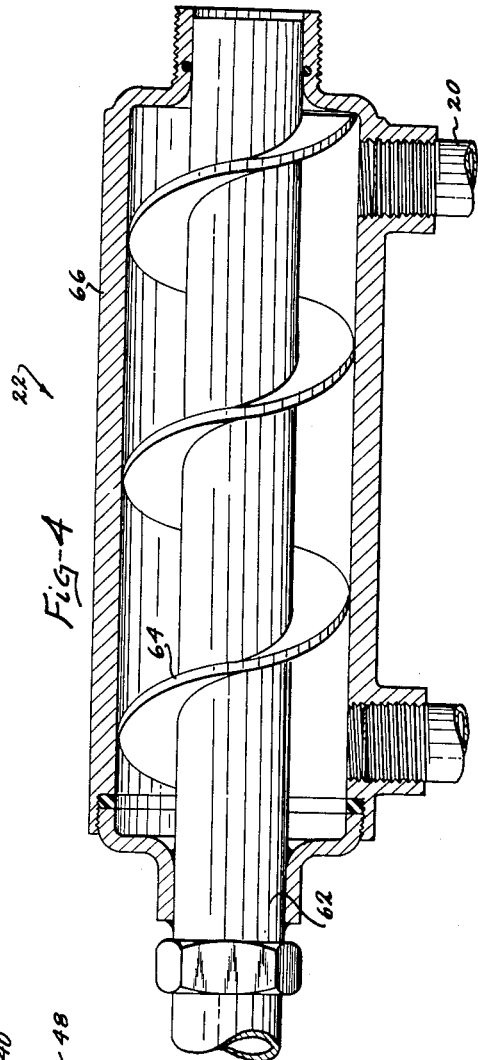
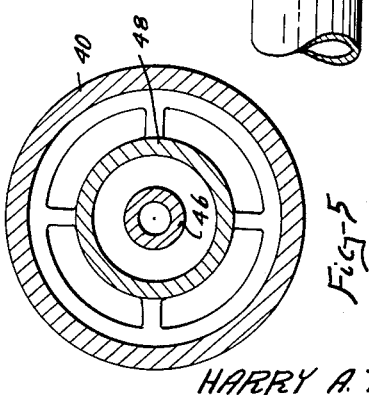
INVENTOR.
HARRY A. TOULMIN JR.
BY
Toulmin & Toulmin
ATTORNEYS ન
3,069,736
METHOD AND APPARATUS TO STERILIZE PUMP WATER AS AND WHEN IT IS PUMPED
Harry A. Toulmin, Jr., Dayton, Ohio, assignor to Commonwealth Engineering Company, Dayton, Ohio, a corporation of Ohio
Filed July 25, 1960, Ser. No. 45,127
6 Claims. (Cl. 21—91)

This invention relates to a method and apparatus for purifying water and is particularly concerned with the heat purification or sterilization of water in a domestic water system such as might be found in rural areas.

In my prior disclosures apparatuses have been disclosed for the sterilization by heat of water as it is being pumped from a well to a place of storage such as a pressurized storage tank. In these arrangements the water is caused to flow over and through sterilizing units disposed in the drop pipe leading from the pump to the well, or in the pump itself and in this manner heat sterilized water is delivered to the storage tank.

The present invention represents a further advance and improvement in the art of sterilization of water by heat during the period that the water is moving from the well through a pump and to a storage tank.

The present invention is particularly concerned with the sterilization of the water after it has left the pump and at which time the water is under pressure and can thus be sterilized more efficiently than it can be when it is in the drop pipe of the pump and at which time the water is usually under less than atmospheric pressure.

An object of this invention, accordingly, is the provision of a method and apparatus for the heat sterilization of water which will be more efficient and therefore more economical than heretofore known methods and apparatus of this nature.

A still further object of this invention is the provision of a unit operable for heat sterilization of water passing therethrough which can be installed in a water system between the pump and the storage tank that receives the water.

A still further object of this invention is the provision of an arrangement for the heat sterilization of water as it moves from a pump to a storage tank which will require only a small amount of power and in which the water delivered to the storage tank is at a temperature only slightly in excess of the temperature of the water drawn from the well.

Figure 1:
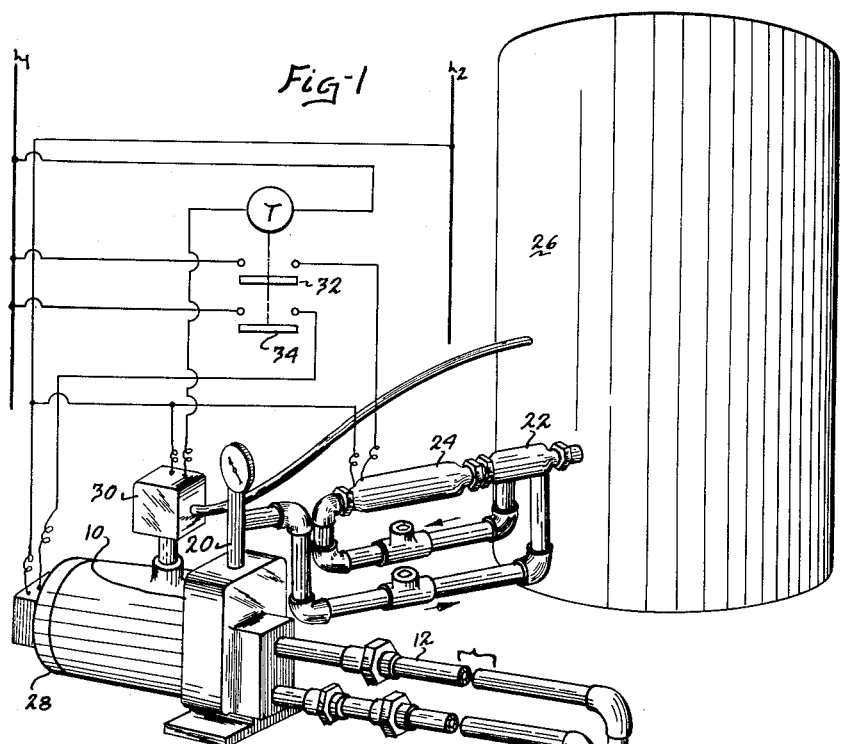
Figure 2:
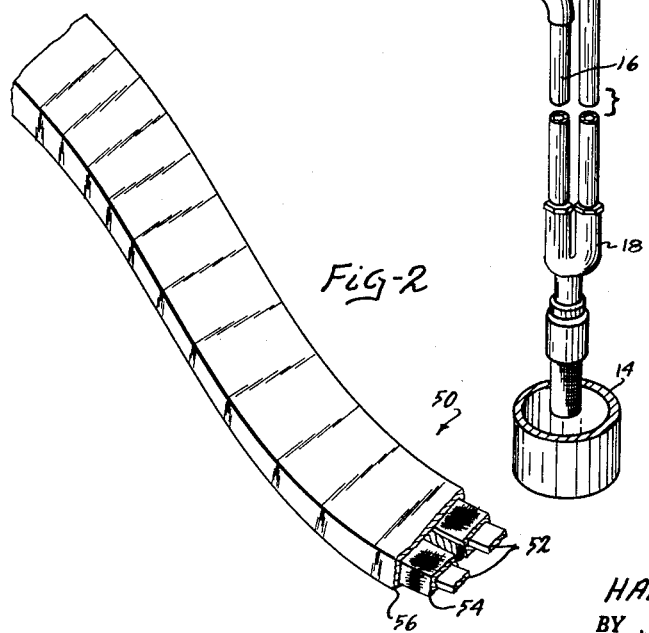

The foregoing objects, as well as still other objects and advantages of the present invention, will become more apparent upon reference to the following specification taken in connection with the accompanying drawings, in which:

FIGURE 1 is a perspective view showing a water system having a sterilizing unit according to this invention included therein, FIGURE 2 is a fragmentary perspective view showing one type of heat element that can be employed in the sterilizing unit, FIGURE 3 is a longitudinal sectional view through the sterilizing unit, FIGURE 4 is a longitudinal sectional view through a heat exchanger that is positioned between the sterilizing unit and the storage tank, and FIGURE 5 is a section indicated by line 5—5 on FIGURE 3 showing a cross-section of the sterilizer.

Referring to the drawings somewhat in more detail, the water system illustrated in FIGURE 1 comprising a pump 10 having a suction conduit 12 leading therefrom into well 14. A pressure conduit 16 also leads from the pump into the well to a jet unit 18 associated with conduit 12 whereby the pump can be operated on deep wells. For a shallow well, conduit 16 and jet 18 could be eliminated, or the jet unit can be placed directly in pump 10. The water pumped by pump 10 is discharged to a conduit 20 which leads to a heat exchanger 22 and then flows from the heat exchanger back to the inlet of a sterilizing unit 24 and then passes therethrough and through the heat exchanger to the storage tank 26. The pump 10 is powered by an electric motor 28 under the control of a pressure switch 30 that is influenced by the pressure in discharge conduit 26. The pressure switch is arranged to close at a predetermined lower pressure in tank 26 and to open at a predetermined higher pressure therein. When the switch closes it energizes a timer T which has a first blade 32 that closes and energizes an electric heating element in heat sterilizer 24. A second blade 34 on the timer closes thereafter to energize motor 28 and set pump 10 into operation. By this delay, the sterilizer is brought up to temperature before water commences to flow therethrough.

The construction of the sterilizer will be seen in FIGURE 3 wherein it will be noted that the sterilizer comprises an outer casting part 40 having an inlet end cap 42 threaded therein at one end and an outlet cap 44 threaded therein at the other end. Inlet cap 42 has a tube 46 extended therefrom substantially the entire length of the sterilizer on the axis thereof and it is through this tube that the water enters the sterilizer.

The outlet cap 44 carries a larger tube 48 also located on the axis of the sterilizer and surrounds tube 46 in spaced relation. The water that exits from the right end of tube 46 is thus caused to flow backwardly between tube 46 and tube 48. Located within tube 48, preferably spirally wound therein is an electric resistance heating element 50 which may consist, for example, of two ribbons of resistance material sheathed in temperature resistant electric insulating material and with there being a metallic outer sheath of stainless steel. This is illustrated in FIGURE 2 wherein the resistance ribbons are indicated at 52, and insulating sheaths at 54, and the stainless steel outer sheath at 56.

Terminals for energizing the heat elements can be taken out through cap 44 as by means of cable 58.

The water passing between the tubes is thus heated by the resistance heating element and this water can be heated by a relatively high temperature, well in excess of 212° F. without vaporizing on account of the fact the water is under pressure. It is contemplated by this invention to heat the water to vaporizing temperature if necessary but this will not interfere with the movement of the water through the sterilizer on account of the relatively long cylindrical and annular passages through which the water flows. The steam, if steam is formed, will be flushed through the sterilizer by the incoming water.

The heated water that exits from the left end of tube 48 passes between this tube and the casing 40 and exits from the right end of the sterilizer unit where it may pass over a thermostat 60 which can be utilized to control the energization of the heating elements thereby effecting an economy of electricity. The hot sterilized water leaving the sterilizing unit passes through the heat exchanger 22 of FIGURE 4 by way of the center pipe 62 thereof. This pipe has a spiral fin or fins 64 fitting within the case 66 of the heat exchanger. The cold water entering the heat exchanger from conduit 20 is thus caused to flow around pipe 62 in a spiral path and this will cool the water passing through the heat exchanger.

By properly proportioning the heat exchanger so that there is ample time for heat to be exchanged between the cold well water moving through the heat exchanger in counter-flow relation to the hot sterilized water, the sterilized water can be reduced to a temperature of on the order of about 10 degrees higher than the cold well water at the time the sterilized water is delivered to the storage tank. By such an efficient exchange of heat between the hot and cold water, the power requirements for the sterilizer unit are greatly reduced.

A feature of the present invention resides in the fact that the unit can be placed in existing systems as well as new systems because no modification of the water system is necessary except for the inclusion between the pump and the storage tank of the sterilizer and heat exchanger according to the present invention.

It will be understood that this invention is susceptible to modification in order to adapt it to different usages and conditions; and, accordingly, it is desired to comprehend such modifications within this invention as may fall within the scope of the appended claims.

I claim:

1. In a water system including a well for supplying water and means for sterilizing the water; a tank, a heat exchanger, a pump having its inlet connected with said well and its outlet connected to said heat exchanger, a heat sterilizer unit connected to said heat exchanger, said sterilizer unit comprising an outer casing part, an inlet at one end of the casing part, conduit means leading from said inlet axially along the casing toward the other end thereof, a cylindrical baffle member in the casing surrounding said conduit in spaced relation and closed at the end of the conduit opposite said inlet and being open at the other end, electrical heating means connected to said sterilizer for raising the temperature of the water passing therethrough to sterilization temperature, and an outlet in said casing at the end opposite the inlet for passing water therethrough, said inlet being connected with the outlet of the pump and said outlet being connected with said tank.

2. In a water system including a well for supplying water and means for sterilizing the water; a storage tank, a heat exchanger, a pump having its inlet connected with said well and its outlet connected to said heat exchanger, a sterilizer unit connected to said heat exchanger, said sterilizer unit comprising an outer casing, an inlet conduit in the casing leading from one end toward the other, a baffle member in the casing leading from the said other end toward said one end and in spaced relation with said conduit and with said casing and closed at said other end whereby water entering the sterilizer flows back and forth axially therein, means in the sterilizer for raising the temperature of water passing therethrough to sterilization temperature, said sterilizer having an outlet at its other end, a conduit connecting said outlet with said tank and passing through said heat exchanger, and means leading from the inlet of said sterilizer through said heat exchanger to the outlet of said pump.

3. In a water system including a well for supplying water and means for sterilizing the water; a storage tank, a pump having an inlet connected to said well and also having an outlet, a heat exchanger having first and second passages therethrough, said outlet of the pump being connected with one end of one of said passages through the heat exchanger, a sterilizer unit connected to said heat exchanger and which sterilizer unit comprises an outer casing having an inlet at one end and an outlet at the other, a first cylindrical member in the sterilizer connected with the inlet thereof at one end and open at its other end, a second cylindrical member in the casing telescoping the first cylindrical member and being closed at the end adjacent the other end of the first cylindrical member and open at its other end, means in said second cylindrical member for heating water passing therethrough to sterilization temperature, the outlet of said sterilizer being connected via the other passage means in the heat sterilizer with the tank, and the inlet of said sterilizer being connected with the first mentioned passage means in the heat exchanger.

4. A sterilizer unit adapted for sterilizing water a pump for pumping water from a source, a heat exchanger, a heater sterilizer unit connected to said heat exchanger, said sterilizer unit comprising an outer casing, an inlet in one end of the casing and an outlet in the other end thereof, a conduit in the casing connected with said inlet and extending longitudinally of the casing toward but spaced from said outlet, a cylindrical member in the casing surrounding the conduit in spaced relation and also spaced from the casing and having its one end between the said other end of the conduit and the said outlet being closed and its other end open whereby water entering the inlet flows in one direction from the conduit and then in the other direction through said cylindrical member and then in the said one direction again to the outlet of the sterilizer, and means inside the cylindrical member energizable for heating the water passing therethrough to sterilization temperature.

5. A sterilizer unit for sterilizing water a pump for pumping water from a source, a heat exchange, a heater sterilizer unit connected to said heat exchanger, said sterilizer unit comprising an outer casing, an inlet in one end of the casing and an outlet in the other end thereof, a conduit in the casing connected with said inlet and extending longitudinally of the casing toward but spaced from said outlet, a cylindrical member in the casing surrounding the conduit in spaced relation and also spaced from the casing and having its one end between the said other end of the conduit and the said outlet being closed and its other end open whereby water entering the inlet flows in one direction from the conduit and then in the other direction through said cylindrical member and then in the said one direction again to the outlet of the sterilizer, and means inside the cylindrical member energizable for heating the water passing therethrough to sterilization temperature, said means comprising a spirally wound resistance heating element.

6. A sterilizer unit for sterilizing water a pump for pumping water from a source, a heat exchanger, a heater sterilizer unit connected to said heat exchanger, said sterilizer unit comprising an outer casing, an inlet in one end of the casing and an outlet in the other end thereof, a conduit in the casing connected with said inlet and extending longitudinally of the casing toward but spaced from said outlet, a cylindrical member in the casing surrounding the conduit in spaced relation and also spaced from the casing and having its one end between the said other end of the conduit and the said outlet being closed and its other end open whereby water entering the inlet flows in one direction from the conduit and then in the other direction through said cylindrical member and then in the said one direction again to the outlet of the sterilizer, and means inside the cylindrical member energizable for heating the water passing therethrough to sterilization temperature, said means comprising an electric resistance heater unit having ribbon-like resistance element means therein, electric insulation surrounding said resistance element means, and a metallic sheath surrounding the said insulation.

References Cited in the file of this patent

UNITED STATES PATENTS

| | | |
|---|---|---|
| 2,220,209 | Carpenter | Nov. 5, 1940 |
| 2,635,815 | Dalin et al. | Apr. 21, 1953 |
| 2,693,944 | Fowle | Nov. 9, 1954 |
| 2,827,912 | Lung | Mar. 25, 1958 |
| 2,832,569 | Lewis | Apr. 29, 1958 |
| 2,879,371 | Justiz | Mar. 24, 1959 |
| 2,952,001 | Morey | Sept. 6, 1960 |
| 2,967,523 | Wobbe | Jan. 10, 1961 |
| 3,007,470 | Heeger | Nov. 7, 1961 |

FOREIGN PATENTS

| | | |
|---|---|---|
| 86,530 | Switzerland | Sept. 1, 1920 |
| 451,191 | Italy | Aug. 27, 1949 |